No. 12,342. REISSUED MAY 2, 1905.

B. F. FOWLER.

LAMP BURNER.

APPLICATION FILED JAN. 18, 1905.

B. F. Fowler, Inventor

Witnesses

M. C. Lyddane

B. H. Foster

By E. G. Siggers

Attorney

PHOTO-LITHOGRAPHED BY SACHETT & WILHELMS LITHO. & PT'G CO. NEW YORK.

No. 12,342. Reissued May 2, 1905.

UNITED STATES PATENT OFFICE.

BENJAMIN F. FOWLER, OF MINNEAPOLIS, MINNESOTA, ASSIGNOR, BY MESNE ASSIGNMENTS, TO THE BING BURNER COMPANY, OF MINNEAPOLIS, MINNESOTA, A CORPORATION OF MINNESOTA.

LAMP-BURNER.

SPECIFICATION forming part of Reissued Letters Patent No. 12,342, dated May 2, 1905.

Original No. 735,236, dated August 4, 1903. Application for reissue filed January 18, 1905. Serial No. 241,701.

*To all whom it may concern:*

Be it known that I, BENJAMIN F. FOWLER, a citizen of the United States, residing at Minneapolis, in the county of Hennepin and State of Minnesota, have invented a new and useful Lamp-Burner, of which the following is a specification.

This invention relates to lamp-burners; and one of the objects thereof is to provide a novel construction of a transparent cone which will permit the escape of all the rays of light from the flame and will diffuse them evenly, especially when the light is turned low.

Another object is to provide a novel device by means of which the flame may be easily trimmed, said device also serving to protect the cone against the flame, and thus avoiding its being broken.

The preferred form of construction is fully illustrated in the accompanying drawings, though it will be understood that various changes may be made from this construction.

Figure 1:
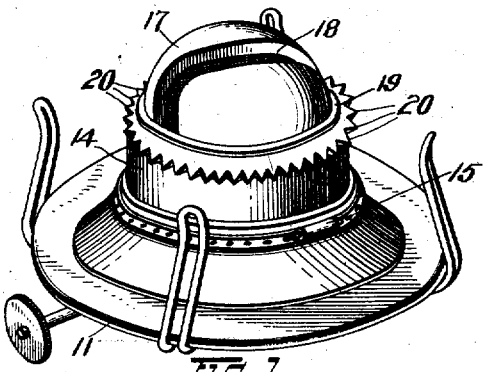
Figure 2:
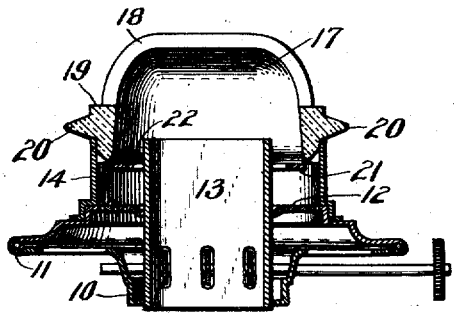
Figure 3:
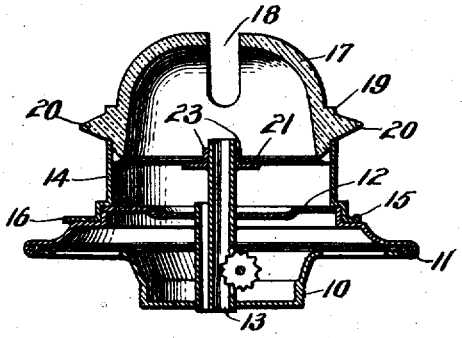
Figure 6:
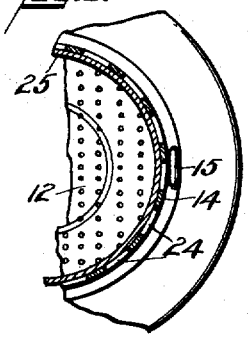
Figure 4:
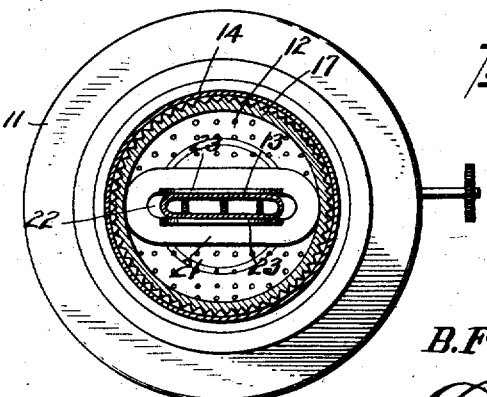
Figure 5:
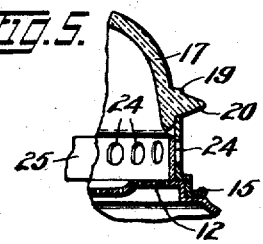

In said drawings, Figure 1 is a perspective view of a lamp-burner constructed in accordance with the present invention. Fig. 2 is a vertical sectional view through the same. Fig. 3 is a similar view taken at right angles to Fig. 2. Fig. 4 is a horizontal sectional view. Fig. 5 is a detail vertical sectional view through a slightly-modified form of construction. Fig. 6 is a horizontal sectional view through the same.

Similar numerals of reference designate corresponding parts in all the figures of the drawings.

In the embodiment of the invention, as shown, the body is constructed of substantially the usual shape, having a threaded boss 10, outstanding flange 11, the perforated platform 12, and the upright wick-tube 13. To this body is connected a metallic collar 14, which, as shown, is hinged at 15, its opposite side being provided with a suitable latch 16, though other means of connection may be employed, if desired. The upper edge of this collar is preferably flush with the upper end of the wick-tube, and said collar supports the cone 17. The cone is of some transparent material, preferably of glass, shown as being formed of one piece, though, as will be readily understood, it may be of more, if desired. Its upper portion is of the usual form, being provided with a flame-opening 18, located directly above the wick-tube. Upon the lower portion of the cone to a slight distance above its lower edge is arranged an annular horizontal rib 19, this rib being provided with outstanding substantially pyramidal projections 20. The lower end of the cone fits within the collar 14, the rib 19 constituting a stop against which the upper edge of said collar abuts.

Mounted upon the wick-tube is arranged a device which may be termed a "flame-trimmer," this device being in the form of a horizontally-disposed spreader plate or platform 21, having a central opening 22, through which the wick-tube passes, this opening being longer than the width of the tube, so that the trimmer may be moved longitudinally. The plate is provided on opposite sides of the opening with upstanding flanges 23, which bear against the opposite sides of the wick-tube and form extended bearing-surfaces to properly support the trimmer.

The burner is employed in the customary manner; but it will be seen that when the light is turned low the rays therefrom will readily pass through the cone, and especially through that portion thereof which carries the rib. As a result the light passing through the rib will be diffused by the projections. The burner is therefore especially useful on night-lamps, as it may be turned down so that no direct rays of light will eminate from the lamp, though the room will be sufficiently illuminated. When the light is turned up, the direct rays can of course pass through the clear and unbroken upper portion of the cone, so that no light is lost. Should the wick be trimmed unevenly and the flame flare at either corner, by moving the trimming-plate longitudinally in one direction or the other, or, in other words, transversely of the wick-tube the draft to the higher portion of the flame may be cut off, and thus the flame may be trimmed. In this way the danger of breaking the cone by the flame striking it is avoided. This trimming operation can be readily accomplished, for by throwing back the cap access is obtained to the spreader-plate.

In Figs. 5 and 6 a slightly-modified form of construction is shown. The construction as above described is still employed; but the metallic collar 14 is provided with a plurality of perforations, which may be in the form of circular openings 24, as shown, or they can be of any shape desired. A transparent shield 25 is located within the collar and covers the opening, said shield being preferably formed of mica. This arrangement permits the greater radiation of light and at the same time the shield prevents the ingress of lateral drafts of air.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

Having thus described my invention, what I claim as new, and desire to secure by Letters Patent, is—

1. In a lamp-burner of the class described, a cone constructed of transparent material and having on its outer face an annular series of outstanding and substantially pyramidal-shaped projections arranged contiguous to its lower end, the portion of the wall above the series being smooth to permit the direct passage of rays of light.

2. In a lamp-burner of the class described, a cone constructed of transparent material and having an annular rib arranged above its lower edge, a metallic collar fitted upon the lower end of the cone, and an annular series of outwardly-projecting angular and tapering transparent projections, arranged upon the rib and projecting over the collar.

3. In a lamp-burner, a wick-tube, a transparent cone covering the tube and having a flame-opening located above the same, said cone having an annular rib on its outer face above its lower edge, a metallic collar fitted upon the lower end of the cone and resting against the rib, the upper end of the collar being substantially flush with the upper end of the wick-tube.

4. In a burner, a wick-tube, a cone extending over the same, and a spreader-platform mounted upon the tube and surrounding the same, said spreader-platform being located inside the cone and movable transversely of the tube independently of said cone.

5. In a burner, a wick-tube, a cone extending over the same, and a substantially horizontal spreader-platform surrounding the tube and movable transversely thereof independently of the cone, said platform being located inside the cone and having upright flanges engaging opposite sides of the tube.

6. In a burner, a body having an upstanding wick-tube, a metallic collar secured to the body about the wick-tube, a glass cone fitted within the upper edge of the collar and having a rib on its outer face, said rib being provided with an annular series of pyramidal-shaped projections, a horizontally-disposed spreader-plate frictionally supported upon the upper end of the wick-tube, said plate being longitudinally adjustable upon the tube.

7. In a burner, a body having an upstanding wick-tube, a metallic collar secured to the body about the wick-tube, a glass cone fitted within the upper edge of the collar and extending above the wick-tube, said cone having an outstanding rib provided with an annular series of outstanding pyramidal projections.

8. In a burner, a body having an upstanding wick-tube, a horizontally-disposed spreader-plate frictionally supported upon the upper end of the wick-tube, said plate being adjustable transversely of the tube, and a cone extending over the tube and plate and housing the same, said plate being movable with respect to the cone.

9. In a lamp-burner, a body having a perforated platform, a threaded boss, and a wick-tube extending from the platform, in combination with a metallic collar displaceably mounted on the platform and surrounding the wick-tube, and a cone constructed wholly of glass extending over the wick-tube and having its lower end fitted within the collar, said cone having a flame opening and constituting the sole burner dome or cover for the tube, said collar terminating on a line with or below the upper end of the tube to permit the unobstructed lateral passage of light from the flame through the glass cone both outwardly and upwardly when said flame is turned low.

10. In a lamp-burner, a body having a perforated platform, a threaded boss projecting from one side of the platform, and a wick-tube extending through the boss and platform and projecting above the side of said platform opposite the boss, in combination with an imperforate metallic collar terminating on a line with or below the upper end of the wick-tube hinged to the platform with its lower edge normally fitting thereon and surrounding the projecting portion of the wick-tube, and a cone constructed wholly of glass extending over the wick-tube and having its lower end snugly fitted within the collar, said cone having a flame-opening in its top and constituting the sole burner dome or cover for the tube, whereby the unobstructed lateral passage of light from the flame is permitted outwardly and upwardly through the glass cone when said flame is turned low.

In testimony that I claim the foregoing as my own I have hereto affixed my signature in the presence of two witnesses.

BENJAMIN F. FOWLER.

Witnesses:
A. MANTHEY,
MATT. GROSS.